Feb. 8, 1927.
J. J. McCARTHY
1,616,590
PULVERIZING AND MULCHING ATTACHMENT
Filed Aug. 29. 1925
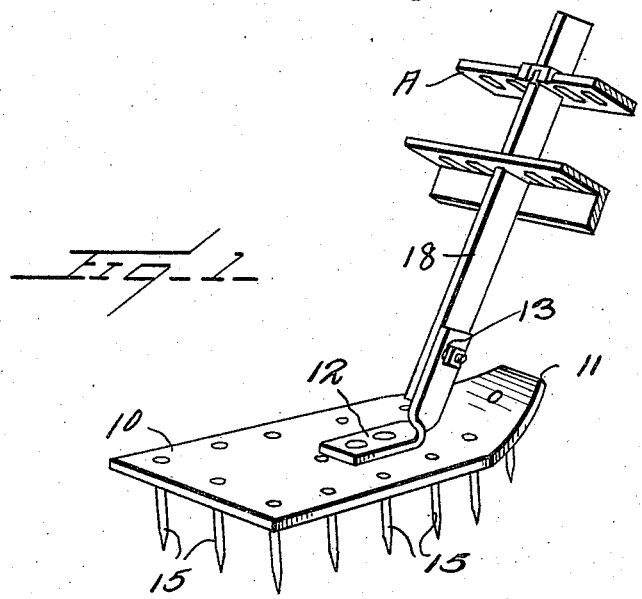
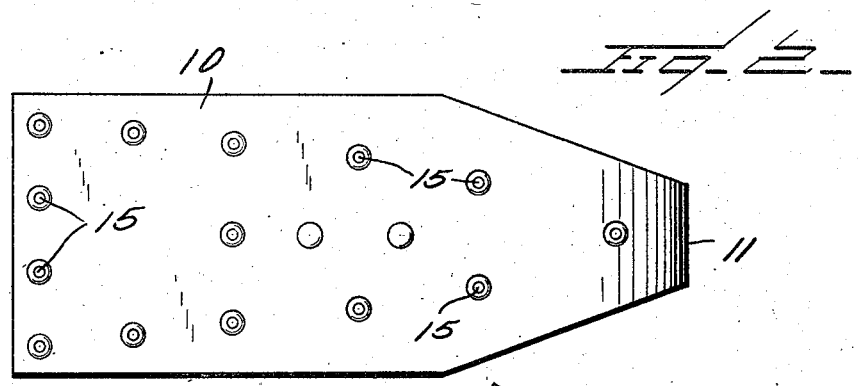
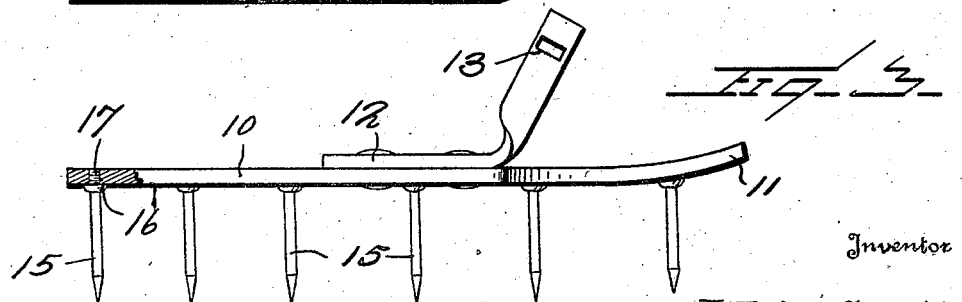
Inventor
J. J. McCarthy
By Watson E. Coleman
Attorney Patented Feb. 8, 1927.

1,616,590

UNITED STATES PATENT OFFICE.

JOHN J. McCARTHY, OF DELTA, COLORADO.

PULVERIZING AND MULCHING ATTACHMENT.

Application filed August 29, 1925. Serial No. 53,342.

This invention relates to ground pulverizing devices, and the general object of the invention is to provide a pulverizing device which may be readily connected to beet cultivators or other agricultural implements of like character and which in its passage over the ground will break up the earth so as to form a mulch of very finely broken up earth particles upon the top of the ground.

A further object is to provide a device of this character which will not leave lumps or clods or act to shove clods upon small plants.

A still further object is to provide an attachment of this character having a plate formed upon its under face with teeth, the plate being adapted to hold the crust of earth down and with the teeth to pulverize this earth to thereby form a mulch. A further object is to so dispose the teeth on the plate and to so form the plate that the trash, leaves, etc., will be shifted laterally and will not clog the teeth on the plate.

Other objects will appear in the course of the following description.

My invention is illustrated in the accompanying drawing, wherein—

Figure 1 is a perspective view of a pulverizing and mulching attachment showing the cultivating machine to which the device is applied in fragmentary section;

Figure 2 is an under side plan view of the plate 10;

Figure 3 is a side elevation of the structure shown in Figure 2.

Referring to the drawing, 10 designates a plate of sheet metal which is preferably narrowed at its forward end and turned up, as at 11. Attached to the upper face of this plate and extending upward therefrom is a supporting iron or hanger 12 formed at its upper end with a transverse slot 13. Extending from the under face of the plate downwardly are a plurality of teeth 15. These teeth may extend downward any desired distance but will preferably project about three inches below the plate. This plate may be of any desired length or width, but in actual practice I make the plate about twenty-two and a half inches long by nine and a half inches wide.

Preferably the teeth will be drop forged and each tooth formed with a shoulder 16 and with a screw-threaded shank 17 adapted to extend through and engage the plate. Of course, it will be understood that the teeth might be welded to the plate. Preferably the teeth will be slightly tilted relative to the plate in a forwardly extending direction, though I do not wish to be limited thereto.

The supporting hanger 12 is formed, as before stated, with a slot at its upper end, and a shank 18 extending downward from the beet cultivator A is bolted to the member 12 by a plurality of bolts passing through the slots. This permits the part 12 to be adjusted as desired. While I have used this device in connection with a beet cultivator and mounted it upon a beet cultivator, I do not wish to be limited to this as it might be mounted upon any agricultural machine such as ordinary cultivators, planters, etc.

The purpose of the slot 13 is to permit the shoe 10 to be tipped to a slanting position or disposed in a horizontal position and then held in place firmly by the bolt passing through the slot. In actual use, there will be two or more of these devices mounted upon the implement frame and being disposed in the furrows between the rows. The plates bear against the surface of the ground and act not only to pulverize the ground but to prevent clods and lumps from being thrown off or forced laterally against the plants. The devices make a fine mulch over the top of the ground and this is extremely desirable, particularly in dry weather. The otherwise crusty furrow is broken up into a fine dust-like mulch which will not pack and the plate presses and crumbles the ground, while the teeth break up and scratch it. Preferably the teeth will be set in triangular relation with the apex of the triangle at the forward end of the device. This is for the purpose of thoroughly tearing up the ground and destroying weeds between the rows of plants. The shank 18 might be disposed in angular relation to thus tip the blades or shoes 10 laterally if so desired. This mulcher and pulverizer proceeds upon an entirely different principle from the roller and disk pulverizer which acts to pack the ground while breaking up the clods, whereas my device by reason of the flat form of the metallic shoe upwardly turned at the front holds down the ground while the teeth break up the clods and pulverize the ground, thus preventing tearing up of any portion of the planted rows being cultivated. The effectiveness of this clod breaker and pulverizer is due to the fact that it holds the ground down while the clods are being turned up, whereas an ordinary cultivator tears the whole clod loose and a clod may include a portion of a planted row, thus destroying the plants.

The particular feature of my construction is that my cultivating device holds the ground firmly in place while the teeth tear the ground to pieces. The turned up edge of the cultivator shoe or plate permits it to slip over the ground but the shoe is fastened to the cultivator in such manner as to hold the shoe or plate firmly pressed down against the ground as tightly as possible. The result is that the ground is held firmly in place while the teeth pulverize or mulch the ground. In all irrigated tracts there is more or less flooding of the ground so the water not only goes down the furrow provided for it, but floods out into the row and cakes and bakes and crusts the ground to such an extent that if one would use an ordinary cultivator in cultivating this irrigated ground the clods would lift up which would tear out the little beet or head lettuce plants so that the work of cultivating would be difficult. With my construction it is impossible to lift a clod or move anything because the ground is held under heavy pressure while the cultivator is tearing it to pieces.

It will be noted that my cultivator shoe or plate is tapered toward its forward end and upwardly turned, and that the teeth are arranged in divergent relation toward the rear, or in other words, the outer teeth are arranged in two divergent rows. This is important for the reason that a clod is first struck by the single forward cutter tooth while it is held to the ground under the curved part of the plate or shoe and then the clod is acted upon sucessively by the other cutter teeth, the rearwardly divergent teeth acting to shift weeds, trash or rocks laterally outward on both sides of the cultivator shoe or plate instead of permitting this to gather upon the teeth as would be the case were the teeth arranged in transversely extending rows.

I claim:—

1. A pulverizer and mulcher of the character described comprising a solid metallic plate, having an upwardly turned forward end, the shoe being less in width at its forward end than at its rear end, spikes projecting down from said shoe, the upwardly turned forward end of the shoe being provided with one spike, and there being two lateral rows of spikes extending rearward from said single spike in divergent relation to each other, the plate being provided with an upstanding member whereby it may be engaged with an implement and carried over the ground in close contact therewith.

2. A pulverizer and mulcher of the character described comprising a metallic plate imperforate throughout its entire extent, the forward end of the plate being narrowed and upwardly turned, an upstanding member rigidly attached to the metal plate and extending upward and forward therefrom, and spikes mounted upon the plate and extending downward therefrom, there being a single spike at the upwardly turned forward end of the plate and rearwardly diverging rows of spikes rearward of said forward spike.

In testimony whereof I hereunto affix my signature.

JOHN J. McCARTHY.